United States Patent [19]

Mellwig et al.

[11] Patent Number: 4,720,893
[45] Date of Patent: Jan. 26, 1988

[54] CASTER

[75] Inventors: Dieter Mellwig, Wermelskirchen; Wilfried Kurbjuhn, Radevormwald, both of Fed. Rep. of Germany

[73] Assignee: Albert Schulte Söhne GmbH & Co., Wermelskirchen, Fed. Rep. of Germany

[21] Appl. No.: 841,444

[22] Filed: Mar. 19, 1986

[30] Foreign Application Priority Data

Mar. 19, 1985 [DE] Fed. Rep. of Germany ....... 3509863
Feb. 14, 1986 [DE] Fed. Rep. of Germany ....... 3604586

[51] Int. Cl.$^4$ .............................................. B60B 33/00
[52] U.S. Cl. .................................................... 16/35 R
[58] Field of Search ............... 16/31 R, 31 A, 18 R, 16/35, 18 CG

[56] References Cited

U.S. PATENT DOCUMENTS

| 971,970 | 10/1910 | Campbell | 16/18 CG |
|---|---|---|---|
| 2,129,579 | 9/1938 | Herold | 16/31 R |
| 2,950,121 | 8/1960 | Fisher | 16/35 R |
| 2,972,163 | 2/1961 | Ross et al. | 16/35 R |
| 3,409,105 | 11/1968 | Clinton | 16/35 R |
| 3,911,525 | 10/1975 | Haussels | 16/35 R |
| 4,035,864 | 7/1977 | Schroder | 16/35 R |
| 4,077,087 | 3/1978 | Mooney | 16/35 R |
| 4,414,702 | 11/1983 | Neumann | 16/35 R |
| 4,449,268 | 5/1984 | Schnuell | 16/35 R |

FOREIGN PATENT DOCUMENTS

| 1134805 | 11/1957 | Fed. Rep. of Germany | 16/35 R |
|---|---|---|---|
| 2344208 | 3/1975 | Fed. Rep. of Germany | 16/35 R |
| 2721375 | 11/1978 | Fed. Rep. of Germany | 16/35 R |
| 1505319 | 12/1967 | France | 16/35 R |
| 2385 | of 1875 | United Kingdom | 16/31 R |

Primary Examiner—M. Jordan
Attorney, Agent, or Firm—Peter K. Kontler

[57] ABSTRACT

A caster wherein a U-shaped metallic or plastic frame has a vertically extending web and two parallel prongs which support the shaft for the wheel. The upper portion of the space between the prongs is occupied by a block-shaped supporting member which stiffens the frame and is secured to the prongs by a transversely extending bolt. A portion of the supporting member which is adjacent to the upper portion of the web has one or more projections which are received in complementary sockets or holes of the web. That portion of the supporting member which is adjacent to the inner side of the web has a vertical hole for a kingbolt which is held in the supporting member against axial movement and the upper portion of which is externally threaded to be received in the leg of a piece of furniture or the like. The supporting member can be assembled of several mirror symmetrical sections and can further support or can be made integral with a brake shoe and/or a device for releasably locking the supporting member and the frame against rotation about the axis of the kingbolt.

16 Claims, 18 Drawing Figures

CASTER

CROSS-REFERENCE TO RELATED CASES

The caster of the present invention constitutes an improvement over and a further development of casters which are disclosed in commonly owned copending patent applications Ser. Nos. 675,525 of Sachser, 699,795 of Vollberg et al., and 723,249 of Vollberg et al.

BACKGROUND OF THE INVENTION

The present invention relates to casters, and more particularly to improvements in those portions of casters which support the wheel or wheels and enable the wheel or wheels to swivel about a substantially vertical axis, for example, relative to the leg of a piece of furniture, relative to the leg of a hospital bed or the like. Still more particularly, the invention relates to improvements in casters wherein the wheel or wheels are mounted between, and are rotatable relative to, prongs which are connected to each other by a substantially vertical web.

In many conventional casters, the wheel or wheels are rotatably mounted in a one-piece bifurcated frame having a pair of spaced-apart prongs and a vertically extending web which is integral with the prongs to form therewith a substantially U-shaped body. Such frames can be produced by deep drawing. Except in those instances when the caster is a so-called box runner or fix caster, the web of the U-shaped frame can constitute a component part of the swivel bearing which connects the caster to a leg or the like so that the frame and the wheel therein can swivel about an axis which extends at right angles to the axis of the wheel. To this end, the web of the frame can be provided with one or more circular tracks for balls or otherwise configured rolling elements of one or more antifriction bearings which are interposed between the web and the supporting leg. The thus deformed web cooperates with a similar component at the lower end of the leg to form therewith a pair of races for one or more annuli of rolling elements. Alternatively, the web of the U-shaped frame which rotatably supports one or more rollers can be provided with a ring-shaped housing for one or more antifriction bearings surrounding a customary kingbolt extending upwardly beyond the bearing and being affixed to the leg of a piece of furniture or the like.

A drawback of frames which define tracks for rolling elements is that they must be made of an expensive material which is capable of being shaped in a deep drawing machine. The web deforming operation to provide therein one or more tracks for rolling elements is an expensive and time-consuming procedure. The situation is aggravated if the frame must be made of stainless steel or an equivalent high-quality material which presents additional problems in connection with the deformation of the web.

In accordance with a further earlier proposal, the prongs of the U-shaped frame forming part of a caster are integrally connected to each other by a substantially semicircular web or bridge which is welded to a bearing eye. Such solution is not entirely satisfactory because it is not possible to preassemble all component parts of the caster except by utilizing specially designed holding means which must be applied and remain applied until after the establishment of a connection between the prongs and the semicircular web.

OBJECTS AND SUMMARY OF THE INVENTION

An object of the invention is to provide a novel and improved caster wherein the wheel or wheels are rotatably supported in a simple, compact and inexpensive frame.

Another object of the invention is to provide a caster whose frame and the parts which are attached thereto can be mass-produced in available machinery.

A further object of the invention is to provide a caster whose components can be assembled in automated machinery and without the need for specially designed holding means.

An additional object of the invention is to provide a novel and improved supporting member which can be used to secure the U-shaped frame for the wheel or wheels of a caster to the leg of a piece of furniture, of a bed or the like.

Still another object of the invention is to provide novel and improved means for anchoring the kingbolt of a caster in the frame which carries the wheel or wheels.

An additional object of the invention is to provide novel and improved means for holding the frame of the wheel or wheels against swiveling movement about the axis of the kingbolt.

A further object of the invention is to provide novel and improved means for braking the wheel or wheels of the caster.

Another object of the invention is to provide a novel and improved method of assembling the component parts of the aforedescribed caster.

A further object of the invention is to provide a piece of furniture, a bed, a conveyance or another device which embodies or carries one or more casters exhibiting the above outlined features.

The invention is embodied in a caster which comprises a frame having two spaced-apart prongs and a web which connects the prongs to each other. The caster further comprises a substantially block-shaped supporting member which is disposed between and is affixed to the prongs. The web and the supporting member have cooperating male and female coupling means. Such coupling means can comprise one or more projections on the supporting member and one or more complementary sockets in the web. The frame is preferably bifurcated and the supporting member preferably extends substantially at right angles to the web. When the caster is in use, the web is substantially vertical and the supporting member is substantially horizontal. Portions of the prongs then extend downwardly beyond the supporting member, and such portions flank the wheel or wheels which are rotatably mounted in the prongs. The means for affixing the supporting member to the prongs can include at least one bolt which extends transversely of and through the supporting member and the prongs. The end portions of such bolt can be provided with rivet heads at the outer sides of the prongs.

The caster further comprises a kingbolt which is rotatably journalled in the supporting member, and means (for example, a split ring or a nut) for holding the kingbolt against axial movement relative to the supporting member.

The supporting member preferably includes or carries a brake shoe which is adjacent to the periphery of the wheel, and means for moving the brake shoe toward and into engagement with the periphery of the wheel. Such moving means can comprise a lever having a fulcrum which is mounted in the supporting member and is pivotable with reference to the supporting member between a first position in which the brake shoe is free to be disengaged from the periphery of the wheel (for example, under the action of one or more springs or analogous biasing means or due to innate elasticity of the brake shoe) and a second position in which the brake shoe is in frictional engagement with the periphery of the wheel. The caster can also comprise means for releasably locking the kingbolt and the supporting member against rotation relative to each other. Such locking means is preferably mounted in and is movable relative to the supporting member between operative and inoperative positions, and the caster can further comprise means (for example, one or more coil springs) for biasing the locking means to its inoperative position. In accordance with a presently preferred embodiment of the invention, the locking means is reciprocable in the supporting member between operative and inoperative positions, and the moving means can include means (such as the aforementioned fulcrum) for moving the locking means to the operative position in response to movement of the brake shoe toward and into frictional engagement with the periphery of the wheel. Thus, the moving means can perform the dual function of actuating the brake shoe simultaneously with movement of the locking means to its operative position.

The supporting member can contain or can carry one or more antifriction bearings (such as radial and/or axial bearings) for the kingbolt.

In accordance with a further embodiment of the invention, the means for moving the brake shoe of the braking means into engagement with the periphery of the wheel can include an elongated displacing element which is non-rotatably mounted in the kingbolt and is movable longitudinally of the kingbolt between a first position in which the displacing element maintains the brake shoe in engagement with the periphery of the wheel and a second position in which the brake shoe is free to move away from the wheel, for example, under the action of biasing means. Such biasing means can react against the frame and can bear against the brake shoe to move the latter away from the periphery of the wheel as soon as the displacing element is retracted. The displacing element can be provided with a bevel gear, and the brake shoe can be provided with a complementary internal gear which mates with the bevel gear when the displacing element is moved downwardly toward the periphery of the wheel.

In accordance with a further embodiment of the invention, the supporting member can be assembled of a plurality of discrete sections. For example, the supporting member can be assembled of two sections which are substantially mirror symmetrical to each other with reference to a plane which extends at right angles to the axis of the wheel and is disposed midway between the prongs of the frame. Such sections have abutting surfaces and can be provided with complementary sockets which are machined into or are otherwise formed in the respective surfaces. A portion of the kingbolt can be mounted in such sockets for rotation relative to the assembled supporting member. At least one antifriction bearing can be interposed between the just mentioned portion of the kingbolt and the sections of the composite supporting member. Such portion of the kingbolt can be provided with a circumferential collar which is rotatably received in the sockets, and the sections of the supporting member are preferably provided with means (such as suitably configured internal surfaces) for holding the collar against axial movement relative to the supporting member. The axis of the kingbolt is preferably normal to and crosses in space with the axis of the wheel. If the composite supporting member comprises two sections, the sections are preferably mirror symmetrical to each other with reference to the plane in which the surfaces of the two sections abut against each other. At least one section of the composite supporting member can be provided with one or more additional sockets, recesses, cavities or the like for one or more portions of means for braking the wheel or wheels and/or means for releasably locking the kingbolt and the supporting member against rotation relative to each other.

The novel features which are considered as characteristic of the invention are set forth in particular in the appended claims. The improved caster itself, however, both as to its construction and the mode of assembling the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
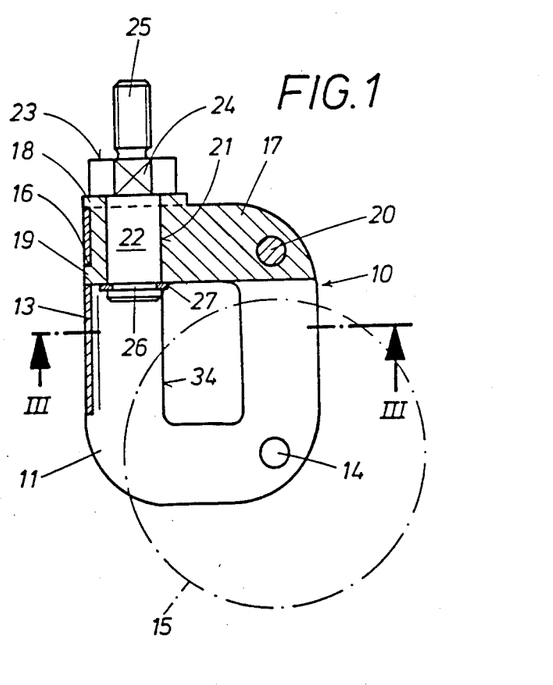
FIG. 1 is a longitudinal vertical sectional view of a caster which embodies one form of the present invention, the wheel of the caster being indicated by a phantom-line circle.
Figure 2:
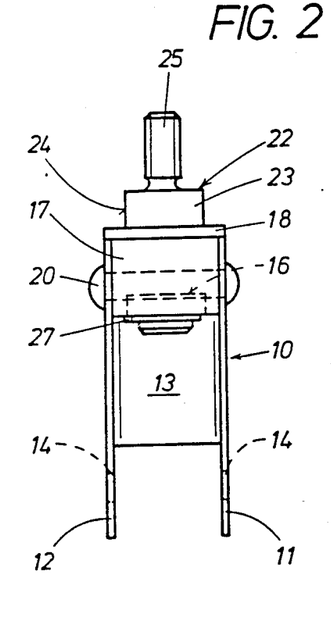
FIG. 2 is an end elevational view of the caster as seen from the right-hand side of FIG. 1, with the wheel omitted.
Figure 3:
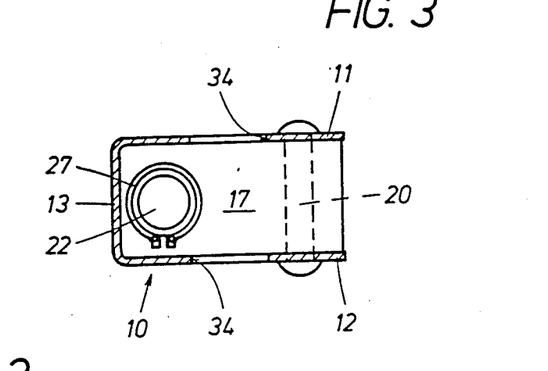
FIG. 3 is a horizontal sectional view of the caster as seen in the direction of arrows from the line III—III of FIG. 1.

Referring first to FIGS. 1 to 3, there is shown a caster which comprises a U-shaped frame 10 including two spaced-apart parallel legs or prongs 11, 12 and a web or bridge 13 which connects the front end portions of the prongs to each other (as considered in the direction of travel of the caster, namely in a direction from the right to the left, as viewed in FIG. 1). The frame 10 is a one-piece body made of sheet metal and obtained from a flat blank as a result of bending of the prongs 11 and 12 at right angles to the plane of the web 13. The prongs 11 and 12 are formed with cutouts in the form of rectangular windows 34 in order to reduce the overall weight and the cost of the frame 10. When the caster of FIGS. 1 to 3 is in actual use, the web 13 is located in a substantially vertical plane ahead of the wheel 15 which is disposed between the prongs 11, 12 and whose shaft (not shown) is mounted in registering circular holes 14 of the prongs. The frame 10 is open from below and from its rear side; the front side of the frame 10 is closed by the web 13; and the upper side of the frame 10 is closed by a substantially block-shaped one-piece supporting member 17 which extends into the space between the upper portions of the prongs 11 and 12 and is affixed thereto by a horizontal bolt 20 which traverses the supporting member and the upper portions of the prongs and whose end portions are deformed so as to constitute rivet heads (see FIGS. 2 and 3). The lower portions of the prongs 11 and 12 extend downwardly beyond the supporting member 17. The latter is disposed in a substantially horizontal plane at right angles to the substantially vertical plane of the web 13.

In accordance with a feature of the invention, the front portion of the supporting member 17 and the adjacent upper portion of the web 13 are provided with complementary coupling means for fixedly securing the member 17 to the frame 10 in addition to the affixing means 20. The coupling means comprises an elongated narrow female coupling member or socket 16 which is machined into or is otherwise formed in the web 13, and a complementary forwardly extending elongated projection 19 of the supporting member 17. The upper portion of the supporting member 17 is preferably provided with a ledge 18 which overlies the upper edge faces of the prongs 11, 12 and web 13. It has been found that the ledge 18, the projection 19 and the bolt 20 suffice to ensure reliable retention of the supporting member 17 in the upper portion of the frame 10, namely in the space between the web 13 and the prongs 11, 12.

If the caster of FIGS. 1 to 3 is to constitute a so-called box runner, the upper right-hand portion of the supporting member 17 (as viewed in FIG. 1) is not rounded; the thus modified supporting member has a horizontal top surface which extends all the way to the planes of the right-hand edge faces of the prongs 11 and 12. The modified supporting member 17 is further provided with one or more holes for screws, bolts or other suitable means for non-rotatably securing the supporting member to the underside of a trolley, tray, or other receptacle which is to be capable of rolling along the ground or along the floor in a plant or the like.

The front portion of the supporting member 17 is provided with a vertical hole 21 for the lower portion of a kingbolt 22 which is rotatably mounted in the hole close to the inner side of the web 13 and is held against axial movement by a split ring 27 or a like device. The split ring 27 is received in a circumferential groove 26 which is machined into or is otherwise formed in the lower end portion of the kingbolt 22. The kingbolt 22 defines a vertical swivel axis about which the frame 10, the supporting member 17 and the wheel 15 can turn with reference to the leg of a piece of furniture, the leg of a hospital bed or the like. The axis of the kingbolt 22 extends at right angles to and crosses in space with the axis of the wheel 15. The axis of the wheel 15 is located behind the axis of the kingbolt 22, as seen in the direction of travel of the caster.

The median portion 23 of the kingbolt 22 has a hexagonal outline with facets 24 which can be engaged by a wrench or by another suitable tool to rotate the kingbolt relative to a piece of furniture or the like whereby the externally threaded upper end portion 25 of the kingbolt penetrates into a tapped bore of the leg of a hospital bed, the leg of a piece of furniture or the like.

Figure 8:
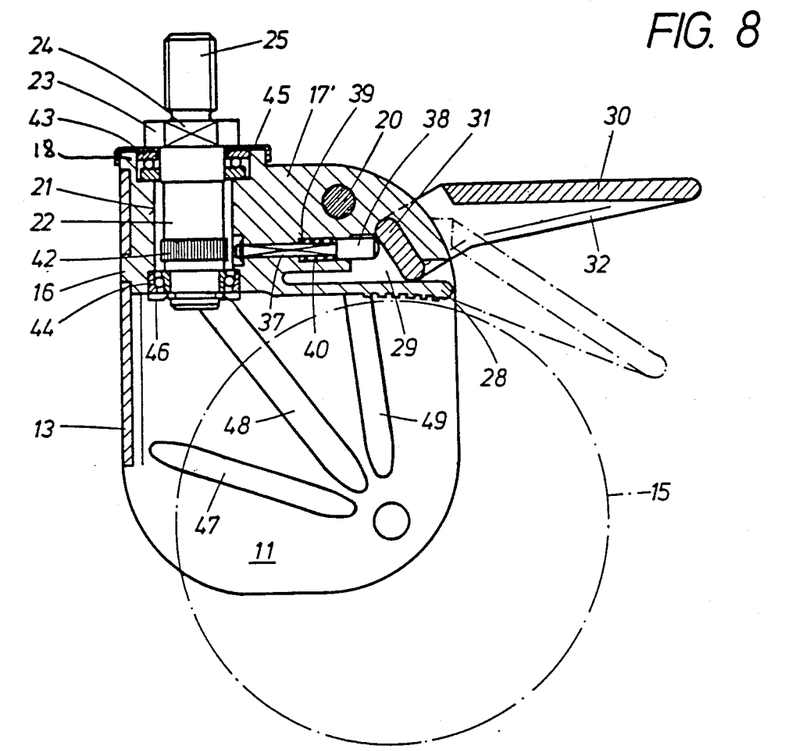
FIG. 8 is a longitudinal vertical sectional view of a caster constituting a second modification of the caster which is shown in FIGS. 4-5.
Figure 9:
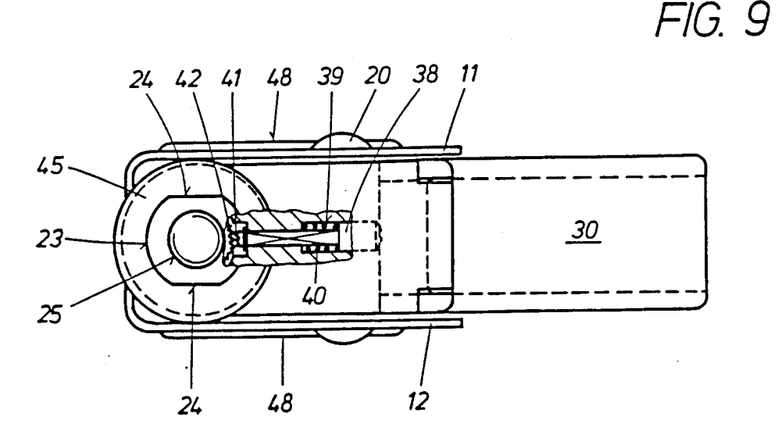
FIG. 9 is a plan view of the caster which is shown in FIG. 8, with a portion of the supporting member broken away to expose the reciprocable component of the means for holding the kingbolt and the supporting member against rotation relative to each other.

It will be readily appreciated that the illustrated mode of holding the kingbolt 22 against axial movement relative to the supporting member 17 and of installing the upper portion 25 of the kingbolt in a piece of furniture or the like constitutes but one of numerous solutions all of which can be resorted to with equal or similar advantage without departing from the spirit and scope of the invention. Other modes of installing the kingbolt 22 in the supporting member 17 are shown in FIGS. 8-9 and in FIGS. 11-18.

An important advantage of the improved caster is that its frame 10 can be made of inexpensive metallic material which need not be capable of being deformed in a deep drawing machine. It is further possible to make the frame 10 and/or the supporting member 17 from a suitable synthetic plastic material which can be shaped in a casting or injection molding machine.

Another advantage of the improved caster is that its component parts can be mass-produced and are readily distinguishable from each other by automatic scanners or sensors so that they can be classified in automatic machinery to ensure automatic assembly of the parts with each other as well as with pieces of furniture or the like. The frame 10, the supporting member 17 and the kingbolt 22 can be properly oriented on conventional conveyors for delivery to an assembly line. The configuration of component parts of the improved caster is simple which also contributes to convenience of automatic assembly. The supporting member 17 reinforces the frame 10 so that such frame can be readily treated in automatic assembly plants.

The making of sockets 16 and windows 34 in a long or short series of frames 10 presents no problems and can be carried out in automatic machinery. The same applies for installation of the bolt 20 and the mounting of the kingbolt 22 in the supporting member 17, either prior or subsequent to assembly of the supporting member with the frame 10.

A further advantage of the improved caster is that its frame 10 can be readily used as a means for carrying one or more wheels 15 for angular movement about a vertical axis (of the kingbolt 22) or that the caster can serve as a box runner whose supporting member is non-rotatably affixed to the underside of a container for discrete commodities or the like.

Figure 4:
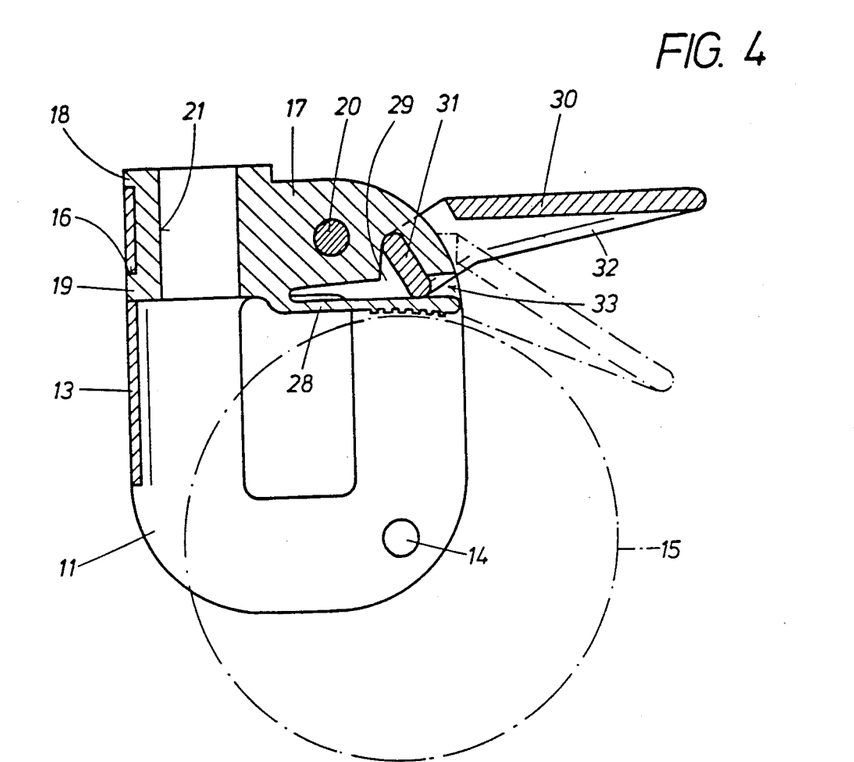
FIG. 4 is a longitudinal vertical sectional view of a second caster, the wheel being indicated by a broken-line circle and the operative position of a foot-operated lever which serves to move a brake shoe of the supporting member toward frictional engagement with the periphery of the wheel being indicated by phantom lines.
Figure 5:
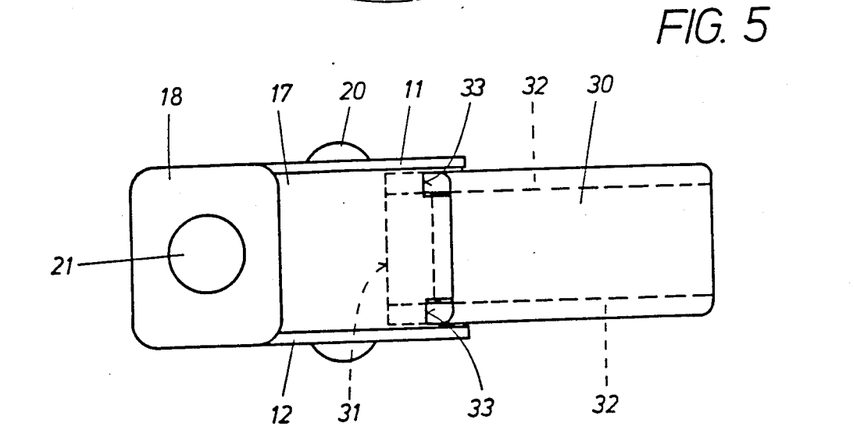
FIG. 5 is a plan view of the caster which is shown in FIG. 4.

FIGS. 4 and 5 show a modified caster wherein all such parts which are identical with or clearly analogous to the corresponding parts of the caster of FIGS. 1 to 3 are denoted by similar reference characters. The kingbolt has been omitted for the sake of clarity. The supporting member 17 is made from a resilient metallic material or from an elastomeric synthetic plastic material and is formed with an integral brake shoe 28 having a serrated, corrugated, toothed or otherwise roughened underside for proper frictional engagement with the periphery of the wheel 15. The brake shoe 28 tends to move upwardly so as to become disengaged from the wheel 15. The means for moving the shoe 28 into frictional engagement with the wheel 15 comprises a foot-operated lever or pedal 30 having an inverted U-shaped arm 32 which extends away from the supporting member 17 and a fulcrum 31 which is integral with the arm 32 and extends into a complementary socket 29 in the upper portion of the supporting member 17. The lower portion of the fulcrum 31 is adjacent to the upper side of the brake shoe 28. When the pedal 30 is depressed by the foot of a person in charge so that it is pivoted from the solid-line to the phantom-line position of FIG. 4, the lower portion of the fulcrum 31 slides along the upper side of the brake shoe 28 and flexes the brake shoe downwardly toward and into proper frictional engagement with the periphery of the wheel 15. The pedal 30 comes to a stop when it reaches the phantom-line position in which the left-hand side of the fulcrum 31 abuts against the adjacent inclined surface bounding the left-hand portion of the socket 29 in the supporting member 17. The socket 29 is a simple recess which is machined into or is otherwise formed in the supporting member 17 at a level above the brake shoe 28. The arm 32 of the pedal 30 comprises two spaced-apart legs (see FIG. 5) which are integral with the respective ends of the fulcrum 31. The fulcrum 31 can be introduced into or withdrawn from its socket 29 upon detachment of the wheel 15 from the lower portions of the prongs 11 and 12. The ends of the socket 29 are open, as at 33, so as to allow for insertion of the junctions between the ends of the fulcrum 31 and the adjacent portions of the two legs of the arm 32.

FIG. 4 shows the brake shoe 28 in its raised or inoperative position in which its underside does not contact the periphery of the wheel 15. The resiliency of the brake shoe 28 suffices to maintain the fulcrum 31 in the illustrated end position or in the other end position to which the fulcrum is moved in response to depression of the pedal 30 so that the pedal assumes the phantom-line position of FIG. 4. Maximum braking action is produced when the fulcrum 31 is substantially vertical, i.e., when it assumes the dead-center position between its two end positions. The brake shoe 28 automatically urges the fulcrum 31 to the one or-to the other end position as soon as the fulcrum leaves its dead-center position and the pedal 30 is free to move toward the solid-line position or toward the phantom-line position of FIG. 4. The pedal 30 extends rearwardly from a level substantially above the shaft for the wheel 15 and counter to the direction of travel of the caster.

An important advantage of the caster of FIGS. 4 and 5 is that it need not be provided with a discrete (separately fabricated) brake shoe. Thus, the brake shoe 28 can constitute an integral part of the supporting member 17. Such supporting member can be made of a suitable metallic or synthetic plastic material. The material of the supporting member 17 may but need not be identical with the material of the frame. It has been found that many available highly wear-resistant synthetic plastic materials can be used for the making of the supporting member 17 and that such materials ensure that the supporting member can stand long periods of use.

Figure 6:
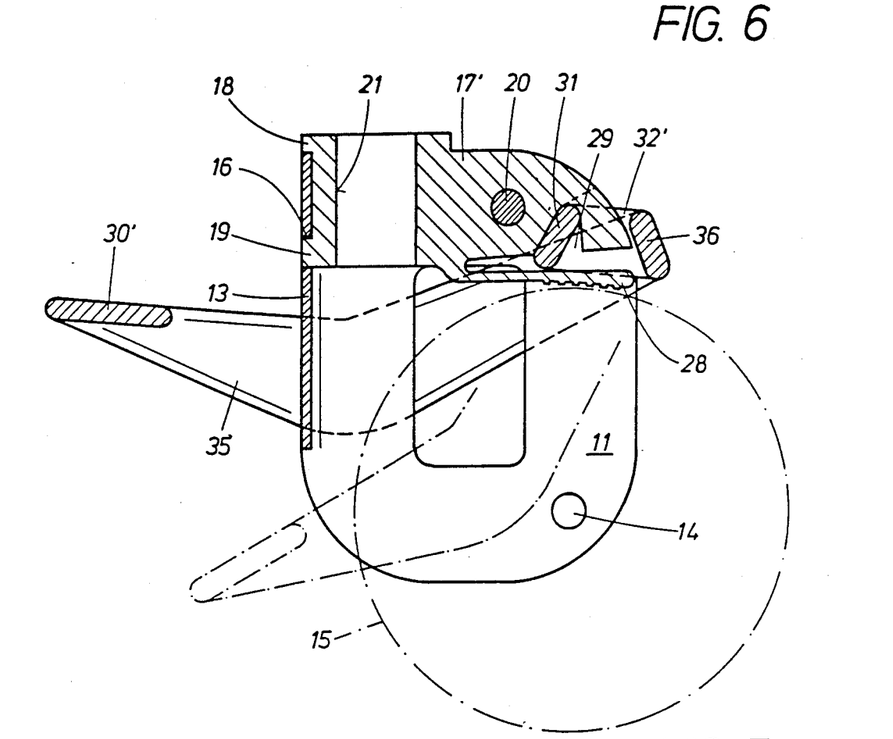
FIG. 6 is a longitudinal vertical sectional view of a third caster constituting a modification of the caster which is shown in FIGS. 4 and 5.
Figure 7:
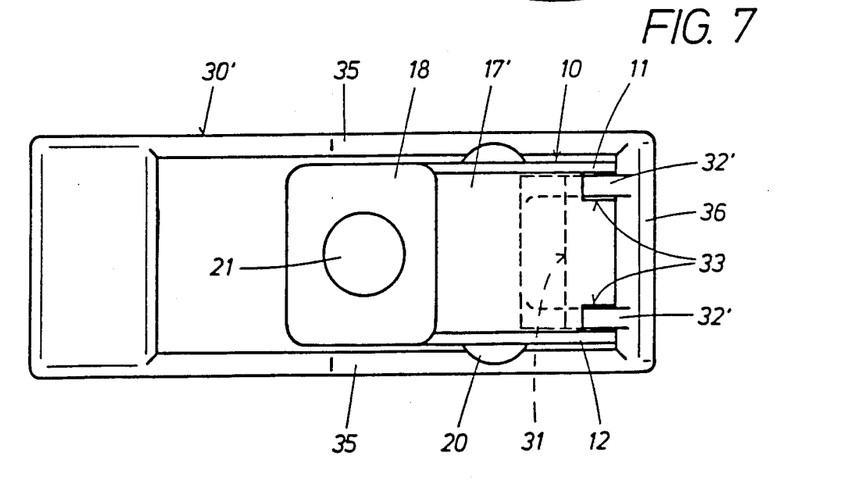
FIG. 7 is a plan view of the caster which is shown in FIG. 6.

FIGS. 6 and 7 illustrate a caster constituting a first modification of the caster which is shown in FIGS. 4 and 5. The pedal 30' of the caster of FIGS. 6 and 7 is a rectangular frame-like member whose composite leg 35 extends forwardly along the sides of the frame 10 so that it can be depressed in front of the web 13. Thus, both sections of the arm 35 extend forwardly and rearwardly of the vertical hole 21 which is provided in the supporting member 17' for the kingbolt, not shown. The rear end portion of the frame-like pedal 30' comprises the fulcrum 31 which is received in the socket 29 of the supporting member 17', and a transversely extending wall member 36 which is integral with the rear end portions 32' of the two sections of the arm 35. As can be seen in FIG. 7, the portions 32' extend into recesses 33 provided in the rear portion of the supporting member 17' so that such rear portion constitutes the pintle of a hinge permitting pivotal movements of the pedal 30' between the solid-line and phantom-line positions of FIG. 6. The construction, configuration and mode of operation of the brake shoe 28, which is an integral part of the supporting member 17', are preferably the same as described in connection with FIGS. 4 and 5.

If desired, the illustrated frame-like pedal 30' can be replaced with a pedal which has two arms at the opposite sides of the fulcrum 31. An advantage of such pedal is that it can be actuated from the front side or from the rear side of the caster.

FIGS. 8 and 9 illustrate a second modification of the caster which is shown in FIGS. 4 and 5. The pedal 30 is similar to or identical with the pedal of the caster which is shown in FIGS. 4 and 5. The prongs 11 and 12 of the frame are reinforced by elongated ribs 47, 48 and 49 so as to adequately stiffen those portions of the prongs which carry the shaft for the wheel 15. Similar or otherwise configurated reinforcing ribs or the like can be provided at the outer side and/or at the inner side of the lower portion of the web 13.

In addition to the brake shoe 28 for the wheel 15, the caster of FIGS. 8 and 9 further comprises means for releasably locking the kingbolt 22 against rotation relative to the supporting member 17' and vice versa, i.e., for holding the caster against swiveling movements about the axis of the kingbolt 22. Such locking means comprises a reciprocable device 37 which is mounted in a horizontal hole or bore 40 of the supporting member 17' and has a toothed front end portion 41 which is movable into engagement with the annulus of external teeth 42 of that portion of the kingbolt 22 which is installed in the hole 21 of the supporting member 17'. The rear end portion of the reciprocable holding or locking device 37 includes an enlarged head 38 which is biased rearwardly by a coil spring 39 mounted in an enlarged portion of the hole 40 in the supporting member 17' and tending to disengage the teeth 41 from the adjacent teeth 42. The arrangement is such that the head 38 is automatically shifted forwardly to activate the device 37 and to thus hold the supporting member 17' against rotation relative to the kingbolt 22 as soon as the pedal 30 is depressed in order to move toward its phantom-line position, i.e., in automatic response to deformation of the brake shoe 28 into frictional engagement with the periphery of the wheel 15. This means that mere depression of the pedal 30 suffices to apply the brake as well as to prevent any swiveling of the caster about the axis of the kingbolt 22. The median portion of the device 37 is preferably polygonal or otherwise deviates from a circular shape so that it cannot be rotated in the complementary hole or bore 40 of the supporting member 17'. The bore 40 has a smaller portion for the non-circular portion of the device 37 and a larger portion for the front part of the head 38 and coil spring 39.

FIG. 8 further shows that the kingbolt 22 is mounted in two antifriction bearings 43, 44 which are installed in the front portion of the supporting member 17'. The upper bearing 43 is a thrust bearing which is recessed into a groove provided in the ledge 18 of the supporting member 17'. The lower bearing 44 is a radial bearing with one or more annuli of balls or otherwise configurated antifriction rolling elements. The races of the lower bearing 44 are held in the illustrated positions by a split ring 46 which simultaneously holds the kingbolt 22 against axial movement relative to the supporting member 17'. The upper bearing 43 is overlapped by a washer-like cap 45 which prevents penetration of foreign matter into the hole 21. It is clear that the positions of the bearings 43, 44 can be interchanged and that the kingbolt 22 can be surrounded by two or more thrust bearings or two or more radial bearings.

The caster of FIGS. 8 and 9 exhibits the advantage that a single actuating device (pedal 30) suffices to operate the means for releasably locking the supporting member 17' against rotation relative to the kingbolt 22 as well as for actuating the brake shoe 28. Moreover, the operation of the locking means is automatically synchronized with the operation of the brake, i.e., the brake is disengaged in automatic response to disengagement of the locking device 37 from kingbolt 22 and vice versa.

The bearings 43 and 44 constitute an optional but highly desirable feature of the caster. It is often sufficient if the kingbolt 22 is mounted in a simple friction bearing. This depends on the circumstances under which the caster is to be put to use.

Figure 10:
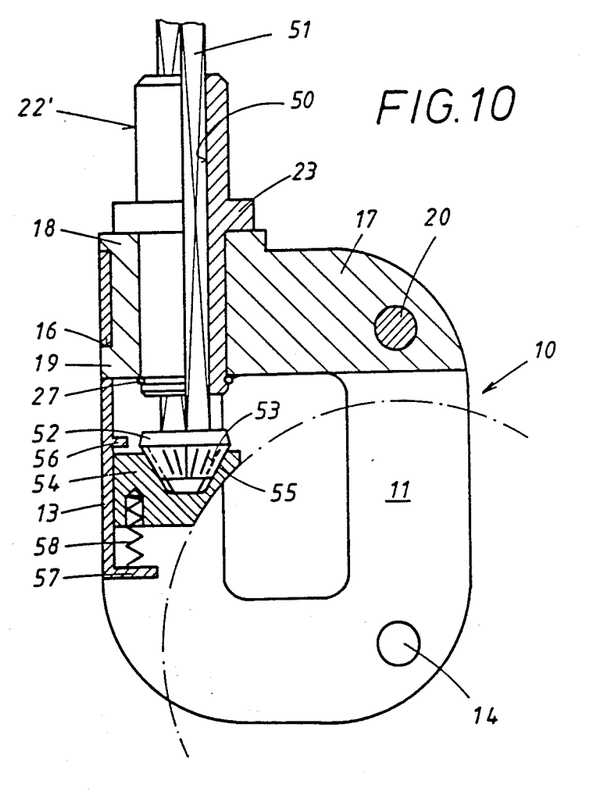
FIG. 10 is a longitudinal vertical sectional view of an additional caster wherein the brake shoe has an internal gear mating with a bevel gear provided on an elongated displacing element which is non-rotatably mounted in the kingbolt.

The caster of FIG. 10 can be used with particular advantage on the legs of hospital beds and the like. This caster has a kingbolt 22' which is formed with a non-circular bore or hole 50 extending in parallelism with its axis and receiving an elongated displacing element 51 forming part of means for moving a reciprocable brake shoe 54 toward and from engagement with the periphery of the wheel. The shank of the displacing element 51 is non-rotatably mounted in the hole 50 and its lower end portion carries a bevel gear 52 which is receivable in a complementary internal gear 55 provided in the upper side of the brake shoe 54. The latter is reciprocable between two retainers or stops 56, 57 at the inner side of the web 13 and is biased upwardly by one or more coil springs 58 tending to maintain the shoe 54 in its disengaged (raised) position. The hole 50 can have a square or rectangular cross-sectional outline. The same applies for the shank of the displacing element 51. This displacing element is reciprocable relative to the kingbolt 22', for example, by a wheel or the like which is within range of the occupant of the bed. The brake shoe 54 can extend all the way between the two prongs of the frame 10. When the shank of the displacing element 51 is moved downwardly so that the teeth 53 of the bevel gear 52 mate with the teeth of the internal gear 55 of the brake shoe 54, the brake shoe is held in proper frictional engagement with the periphery of the wheel and, in addition, the frame 10 and the supporting member 17 are held against rotation about the vertical axis of the kingbolt 22'.

An advantage of the caster which is shown in FIG. 10 is that it can be controlled from a location which is remote from the wheel. The brake shoe 54 cooperates with the displacing member 51 to perform a simultaneous braking and locking action. This will be readily appreciated since, when the bevel gear 52 mates with the internal gear 55, the brake shoe 54 holds the wheel 15 against rotation and simultaneously holds the frame, the wheel and the supporting member against angular movement about the axis of the kingbolt.

Figures 11, 12, 13, 14, 15, 16:
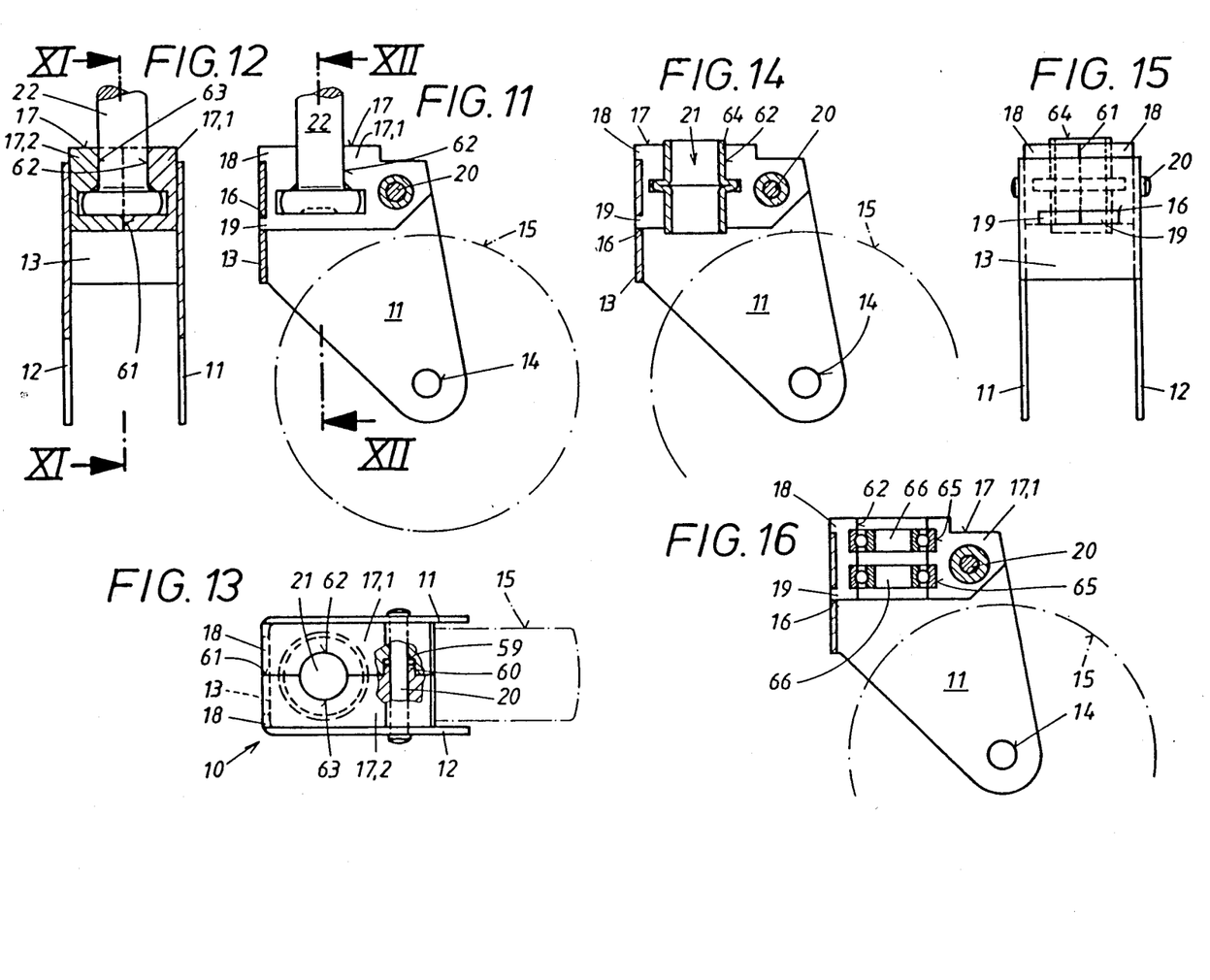
FIG. 11 is a longitudinal vertical sectional view of a further caster which comprises a composite supporting member assembled of two mirror symmetrical parts, the section being taken in the direction of arrows as seen from the line XI—XI of FIG. 12.
FIG. 12 is a vertical sectional view as seen in the direction of arrows from the line XII—XII of FIG. 11.
FIG. 13 is a plan view of the caster which is shown in FIGS. 11 and 12, with a portion of the supporting member broken away.
FIG. 14 is a longitudinal vertical sectional view of a caster constituting a first modification of the caster which is shown in FIGS. 11-13.
FIG. 15 is an end elevational view as seen from the left-hand side of FIG. 14.
FIG. 16 is a longitudinal vertical sectional view of a caster constituting a second modification of the caster which is shown in FIGS. 11-13.

FIGS. 11 to 13 illustrate a further caster which utilizes a composite supporting member 17 including two mirror symmetrical portions or sections 17.1 and 17.2. The two sections have abutting surfaces 61 which are located in a plane disposed midway between the planes of the prongs 11 and 12 and halving the web 13. The surfaces 61 are formed with mirror symmetrical sockets 62 and 63 which together define a hole 21 for the kingbolt 22. The lower portion of the kingbolt 22 constitutes a larger-diameter collar or flange which is received in complementary enlarged portions of the sockets 62 and 63. The surfaces bounding the upper and lower sides of the sockets 62, 63 constitute a means for holding the kingbolt 22 against axial movement relative to the supporting member 17. Each of the sections 17.1 and 17.2 comprises one half of the two-piece ledge 18 and one half of the composite projection 19. The projection 19 is received in an elongated socket or slot 16 of the web 13. The ledge 18 preferably overlaps the upper edge of the web 13 but it can also overlap the upper edges of the prongs 11 and 12. The means for affixing the composite supporting member 17 to the prongs 11, 12 comprises a bolt 20 which traverses the supporting member as well as the upper portions of the prongs and whose end portions can be enlarged to constitute rivet heads.

In order to facilitate predictable assembly of the sections 17.1 and 17.2, one of the surfaces 61 can be provided with a suitable protuberance 60 fitting into a complementary recess 59 of the other section or vice versa. FIG. 13 shows that the section 17.2 has an annular protuberance 60 surrounding the hole for the bolt 20 and received in a complementary circular recess 59 in the surface 61 of the section 17.1.

FIGS. 14 and 15 illustrate a caster which constitutes a first modification of the caster of FIGS. 11 to 13. This caster comprises a two-piece kingbolt including a hollow cylindrical sleeve-like portion 64 which is received in the composite hole 21 of the two-piece supporting member 17 and has a centrally located circumferentially extending collar received in complementary portions of the sockets 62, 63 (only the socket 62 is shown) provided in the abutting surfaces 61 of the sections of the supporting member 17. The tubular portion 64 receives a cylindrical pin (not shown) which constitutes the second part of the kingbolt and is threaded into the leg of a piece of furniture or the like. The manner in which the composite supporting member 17 is affixed to the prongs 11, 12 and to the web 13 is the same as described in connection with FIGS. 1 to 3 and 11 to 13. The collar of the sleeve 64 obviates the need for a washer or other discrete means for holding the kingbolt against axial movement relative to the supporting member 17. The surfaces surrounding the sleeve 64 constitute a friction bearing for the kingbolt. However it is equally possible to surround the sleeve 64 with one or more radial and/or axial antifriction bearings.

FIG. 16 shows an embodiment wherein the composite hole including the sockets 62 and 63 (only the socket 62 is shown) of the two-piece supporting member 17 receives two axially spaced-apart radial antifriction bearings 66. The outer races of the bearings 66 are received in annular grooves 65 which are machined into the surfaces surrounding the sockets 62 and 63. The kingbolt (not shown) has a collar which is disposed between the two bearings 66 to be thus held against axial movement relative to the composite supporting member 17. In all other respects, the caster of FIG. 16 is identical with the caster of FIGS. 11-13 or FIGS. 14-15.

Figure 17:
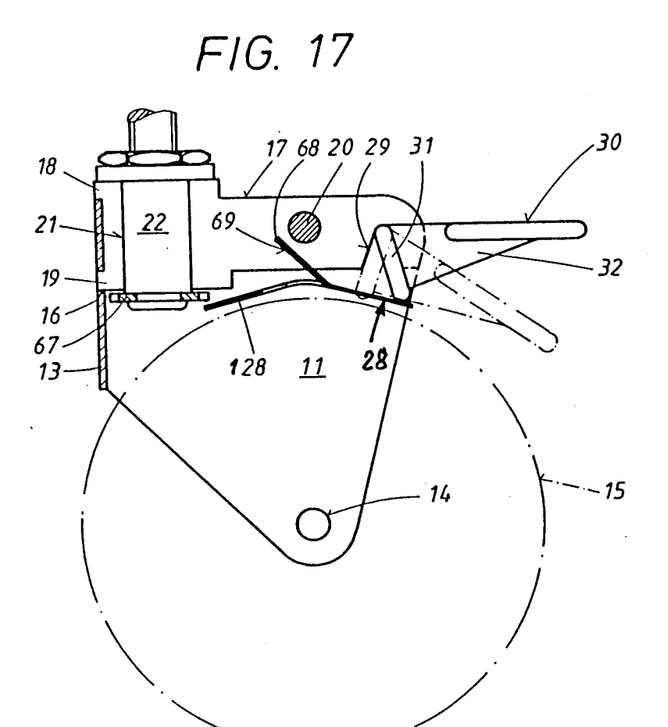
FIG. 17 is a longitudinal vertical sectional view of a caster constituting a third modification of the caster which is shown in FIGS. 11-13.
Figure 18:
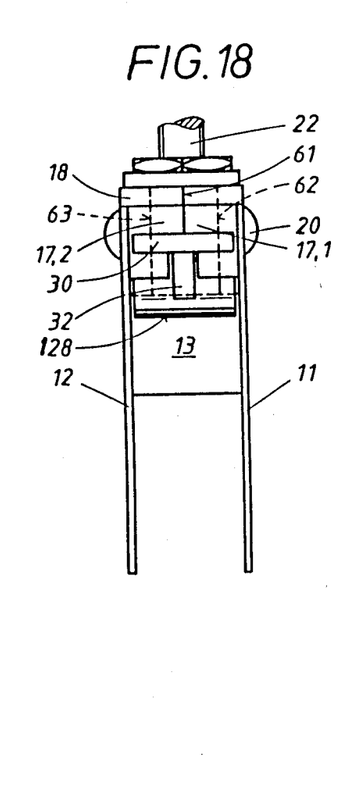
FIG. 18 is an end elevational view of the caster as seen from the right-hand side of FIG. 17.

FIGS. 17 and 18 illustrate a further modification of the caster which is shown in FIGS. 11-13. The composite supporting member 17 of this caster has a composite hole 21 for the lower portion of the kingbolt 22 and the means for holding the kingbolt against axial movement comprises a toothed washer 67 having an annulus of external teeth which can cooperate with the adjacent end portion or pallet of an elastic tongue 128 forming one arm of a three-armed brake shoe 28. Another arm 68 of the brake shoe 28 is anchored in a socket 69 which is provided in the section 17.1 and/or section 17.2 of the composite supporting member 17. The manner in which the right-hand arm of the brake shoe 28 is pivotable by the fulcrum 31 of the pedal 30 is the same as described in connection with FIGS. 4 and 5. An advantage of this construction is that the means for locking the supporting member 17 against rotation about the axis of the kingbolt 22 is integral with the brake shoe, i.e., with the means for holding the wheel 15 against rotation in response to depression of the pedal 30. In this embodiment of the caster, the washer 67 is held against rotation relative to the kingbolt 22. The configuration of the socket 29 for the fulcrum 31 of the pedal 30 is the same as described in connection with FIGS. 4 and 5. The underside of the brake shoe 28 may be provided with teeth, serrations or other unevennesses in order to enhance the braking action which is initiated in response to depression of the pedal 30. The entire brake shoe 28 can constitute a rectangular piece of resilient metallic material (such as sheet steel) the central portion of which has a U-shaped slot so as to permit for depression of a tongue which constitutes the anchoring portion 68 in the socket 69 of the composite supporting member 17. FIG. 17 shows the brake shoe 28 in its inoperative position in which the wheel 15 is free to rotate about its axis relative to the prongs 11 and 12. Depression of the pedal 30 entails an engagement of the brake shoe 28 with the periphery of the wheel 15 as well as a movement of the pallet 128 toward and into mesh with the adjacent teeth on the washer 67 so as to lock the supporting member 17 against rotation relative to the kingbolt 22. The left-hand portion or pallet 128 of the brake shoe 28 can be provided with one or more teeth which are complementary to the teeth at the periphery of the washer 67.

An advantage of the embodiments which are shown in FIGS. 11 to 18 is that the number of parts can be reduced to a minimum due to assembly of the supporting member from several sections. The supporting member can be assembled from more than two sections if such construction is desirable or necessary. The formation of sockets 62, 63 or similar recesses in the the surfaces 61 of the sections 17.1 and 17.2 renders it possible to readily install one or more collars, bearings, and/or other parts. The provision of the sockets 69 and 29 renders it possible to install a combined braking and locking device, for example, in a manner as shown in FIGS. 17 and 18. A single actuating means (such as the pedal 30) suffices to actuate the locking means simultaneously with actuation of the braking means. The composite supporting member 17 can be made from a metallic or synthetic plastic material. The same applies for the frame 10.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. In a caster, the combination of a one-piece frame comprising two spaced-apart prongs and a substantially vertical web connecting said prongs to each other; a discrete supporting member disposed between and affixed to said prongs, said web and said supporting member having cooperating male and female coupling means; a wheel rotatably mounted in and disposed between said prongs, said supporting member including a brake shoe adjacent to the periphery of said wheel; means for moving said brake shoe toward and into engagement with the periphery of said wheel; a kingbolt rotatably journalled in said supporting memeber; and means for releasably locking said supporting member against rotation relative to said kingbolt, said locking means being reciprocable in said supporting member between operative and inoperative positions and said moving means including means for moving said locking means to said operative position in response to movement of said shoe toward and into engagement with the periphery of said wheel.

2. In a caster, the combination of a one-piece frame comprising two spaced-apart prongs and a substantially vertical web connecting said prongs to each other; a discrete supporting member disposed between and affixed to said prongs, said web and said supporting member having cooperating male and female coupling means; a wheel rotatably mounted in and disposed between said prongs, said supporting member including a brake shoe adjacent to the periphery of said wheel; means for moving said brake shoe toward and into engagement with the periphery of said wheel; a kingbolt rotatably journalled in said supporting member; means for releasably locking said supporting member against rotation relative to said kingbolt, said locking means being movable in said supporting member between operative and inoperative positions; and means for biasing said locking means to said inoperative position.

3. In a caster, the combination of a frame comprising two spaced-apart prongs and a web connecting said prongs to each other; a supporting member disposed between and affixed to said prongs, said web and said supportng member having cooperating male and female coupling means; a wheel rotatably mounted in and disposed between said prongs, said supporting member including a brake shoe adjacent the periphery of said wheel; and means for moving said brake shoe toward and into engagement with the periphery of said wheel, said moving means comprising a lever including a fulcrum pivotably mounted in said supporting member and pivotable with reference to said supporting member between a first position in which said brake shoe is free to be disengaged from the periphery of said wheel and a second position in which said brake shoe is in frictional engagement with the periphery of said wheel.

4. In a caster, the combination of a bifurcated frame comprising two spaced-apart prongs and a substantially vertical web connecting said prongs to each other, a substantially vertical supporting member extending substantially at right angles to said web and disposed between and affixed to said prongs, said prongs including portions which extend downwardly beyond said supporting member, said web and said supporting member having cooperating male and female coupling means including at least one projection provided on said supporting member and a complementary socket provided for said projection on said web, and means for affixing said supporting member to said prongs including a bolt extending transversely of and through said supporting member and said prongs.

5. The structure of claim 4, further comprising a wheel rotatably mounted in and disposed between said prongs, said supporting member including a brake shoe adjacent to the periphery of said wheel and further comprising means for moving said brake shoe toward and into engagement with the periphery of said wheel.

6. The structure of claim 5, further comprising a kingbolt rotatably journalled in said supporting member and means for releasably locking said supporting member against rotation relative to said kingbolt.

7. The structure of claim 4, further comprising a kingbolt rotatably journalled in said supporting member, a wheel rotatably mounted in and disposed between said prongs, a brake shoe mounted in said frame and movable toward and from frictional engagement with the periphery of said wheel, and means for moving said shoe into engagement with the wheel including an elongated displacing element non-rotatably mounted in said kingbolt and movable longitudinally of the kingbolt between a first position in which said element maintains the shoe in engagement with the wheel and a second position in which the shoe is free to move away from the wheel.

8. The structure of claim 7, further comprising means for biasing said shoe away from said wheel.

9. The structure of claim 7, wherein said displacing element includes a bevel gear and said shoe has a complementary internal gear for said bevel gear.

10. The structure of claim 4, wherein said supporting member comprises a plurality of discrete sections.

11. In a caster, the combination of a frame comprising two spaced-apart prongs and a web connecting said prongs to each other; a supporting member disposed between and affixed to said prongs, said web and said supporting member having cooperating male and female coupling means and said supporting member comprising a plurality of discrete sections including a first and a second section, said sections having abutting surfaces and complementary sockets provided in said surfaces; and a kingbolt having a portion rotatably received in said sockets.

12. The structure of claim 11, further comprising at least one antifriction bearing interposed between said portion of said kingbolt and said first and second sections.

13. The structure of claim 11, wherein said portion of said kingbolt has a circumferential collar rotatably received in said sockets, said first and second sections having means for holding said collar against axial movement relative to said supporting member.

14. The structure of claim 11, wherein the axis of said kingbolt is normal to and crosses in space with the axis of said wheel, said sections being mirror symmetrical to each other with reference to the plane in which said surfaces abut each other.

15. The structure of claim 11, wherein at least one of said sections has at least one additional socket and further comprising means for braking and/or locking at least one of the parts including the wheel and the kingbolt, said braking means including a portion which is received in said additional socket.

16. In a caster, the combination of a frame comprising two spaced-apart prongs and a web connecting said prongs to each other; a wheel mounted in and disposed between said prongs for rotation about a predetermined axis; and a supporting member disposed between and affixed to said prongs, said web and said supporting member having cooperating male and female coupling means and said supporting member comprising a plurality of discrete sections including two sections which are substantially mirror symmetrical to each other with reference to a plane extending at right angles to said predetermined axis.

* * * * *